United States Patent
Nishimura

(10) Patent No.: US 9,382,985 B2
(45) Date of Patent: Jul. 5, 2016

(54) VEHICLE POWER TRANSMISSION DEVICE

(71) Applicant: HONDA MOTOR CO., LTD., Tokyo (JP)

(72) Inventor: Yuji Nishimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/427,804

(22) PCT Filed: Aug. 30, 2013

(86) PCT No.: PCT/JP2013/073296
§ 371 (c)(1),
(2) Date: Mar. 12, 2015

(87) PCT Pub. No.: WO2014/042018
PCT Pub. Date: Mar. 20, 2014

(65) Prior Publication Data
US 2015/0211612 A1    Jul. 30, 2015

(30) Foreign Application Priority Data
Sep. 13, 2012   (JP) .................................. 2012-201246

(51) Int. Cl.
*F16H 29/04* (2006.01)

(52) U.S. Cl.
CPC ............... *F16H 29/04* (2013.01); *Y10T 74/151* (2015.01); *Y10T 74/1523* (2015.01)

(58) Field of Classification Search
CPC ...................................................... F16H 29/04
See application file for complete search history.

(56) References Cited

U.S. PATENT DOCUMENTS

| 1,343,254 | A |   | 6/1920 | Dunn |
| 1,945,702 | A |   | 2/1934 | Pitter |
| 4,182,203 | A | * | 1/1980 | Drury ..................... F16H 29/04 74/30 |

(Continued)

FOREIGN PATENT DOCUMENTS

| GB | 330137 A | 6/1930 |
| JP | 2005-502543 A | 1/2005 |
| JP | 2012-506003 A | 3/2012 |
| JP | 2012-141048 A | 7/2012 |

OTHER PUBLICATIONS

International Search Report dated Nov. 19, 2013 corresponding to International Patent Application No. PCT/JP2013/073296 and English translation thereof.

*Primary Examiner* — Terence Boes
(74) *Attorney, Agent, or Firm* — Squire Patton Boggs (US) LLP

(57) ABSTRACT

When six transmission units of a vehicle power transmission device are defined as unit #1, unit #2, unit #3, unit #4, unit #5 and unit #6 in order from one end side in the axial direction toward the other end side, the phase of unit #6 relative to the phase of unit #1, the phase of unit #2 relative to the phase of unit #6, the phase of unit #4 relative to the phase of unit #2, the phase of unit #3 relative to the phase of unit #4, the phase of unit #5 relative to the phase of unit #3, and the phase of unit #1 relative to the phase of unit #5 are each displaced by 60° in the same direction, and therefore, even if an unbalanced load due to centrifugal force acting on eccentric disks of each of the transmission units is generated, it is possible to minimize the load acting on bearings supporting opposite ends of the input shaft and reduce the vibration.

2 Claims, 10 Drawing Sheets

(56) References Cited

U.S. PATENT DOCUMENTS

| | | | | |
|---|---|---|---|---|
| 2014/0033841 A1* | 2/2014 | Nishimura | ............ | F16H 29/04 74/65 |
| 2014/0106929 A1* | 4/2014 | Kobayashi | ............ | F16H 29/04 477/5 |
| 2015/0292604 A1* | 10/2015 | Nishimura | ............ | F16H 29/04 74/117 |
| 2016/0032881 A1* | 2/2016 | Ichikawa | ............ | F02D 29/02 74/7 R |
| 2016/0033020 A1* | 2/2016 | Ichikawa | ............ | B60W 10/06 74/117 |

* cited by examiner (A) CONVENTIONAL EXAMPLE (B) EMBODIMENT (C)

VEHICLE POWER TRANSMISSION DEVICE

TECHNICAL FIELD

The present invention relates to a vehicle power transmission device that transmits rotation of an input shaft connected to a drive source to an output shaft connected to a driven wheel, the vehicle power transmission device including six transmission units arranged side by side at equal intervals in an axial direction.

BACKGROUND ART

A continuously variable transmission that converts rotation of an input shaft connected to an engine into back-and-forth movement of a plurality of connecting rods having different phases from each other, and converts the back-and-forth movement of the plurality of connecting rods into rotational movement of an output shaft via a plurality of one-way clutches is known from Patent Document 1 below.

RELATED ART DOCUMENTS

Patent Documents

Patent Document 1: Japanese Patent Publication (PCT) No. 2005-502543

SUMMARY OF THE INVENTION

Problems to be Solved by the Invention

The continuously variable transmission described in Patent Document 1 above includes a plurality of transmission units disposed side by side in the axial direction, and since eccentric disks of these transmission units rotate eccentrically around the input shaft with different phases from each other, there is the problem that a cyclical unbalanced load acts on bearings that support opposite end parts of the input shaft, thus causing vibration.

Since the total unbalanced load acting on the bearings supporting opposite end parts of the input shaft from the plurality of transmission units changes according to the distance between the bearing and the transmission unit and the phase of the eccentric disks of the plurality of transmission units, it can be expected that if the phases of the eccentric disks are appropriately determined according to the positions in the axial direction of the plurality of transmission units, it will be possible to reduce tale total unbalanced load acting on the bearing.

The present invention has been accomplished in light of the above circumstances, and it is an object thereof to reduce vibration of a vehicle power transmission device that includes six transmission units that intermittently transmit driving force with different phases.

Means for Solving the Problems

In order to attain the above object, according to a first aspect of the present invention, there is provided a vehicle power transmission device comprising six transmission units for transmitting rotation of an input shaft connected to a drive source to an output shaft, the transmission units being arranged side by side in an axial direction between the input shaft and the output shaft, the transmission units each comprising an input side fulcrum that rotates eccentrically together with the input shaft, a one-way clutch that is connected to the output shaft, an output side fulcrum that is provided on an outer member of the one-way clutch, and a connecting rod that has opposite ends connected to the input side fulcrum and the output side fulcrum and moves back and forth, wherein when the six transmission units are defined as unit #1, unit #2, unit #3, unit #4, unit #5 and unit #6 in order from one end side in the axial direction toward the other end side, the phase of unit #6 relative to the phase of unit #1, the phase of unit #2 relative to the phase of unit #6, the phase of unit #4 relative to the phase of unit #2, the phase of unit #3 relative to the phase of unit #4 the phase of unit #5 relative to the phase of unit #3, and the phase of unit #1 relative to the phase of unit #5 are each displaced by 60° in the same direction.

Further, according to a second aspect of the present invention, in addition to the first aspect, the transmission unit changes the speed of rotation of the input shaft and transmits the rotation to the output shaft by changing an amount of eccentricity of the input side fulcrum from the axis of the input shaft.

An eccentric disk 19 of an embodiment corresponds to the input side fulcrum of the present invention, a pin 37 of the embodiment corresponds to the output side fulcrum of the present invention, and an engine E of the embodiment corresponds to the drive source of the present invention.

Effects of the Invention

In accordance with the first aspect of the present invention, when the input shaft connected to the drive source rotates, the input side fulcrum of each transmission unit rotates eccentrically, the connecting rod having one end connected to the input side fulcrum moves back and forth, and the output shaft then rotates via the one-way clutch, to which the other end of the connecting rod is connected. When the input side fulcrum of each transmission unit rotates eccentrically, a load due to centrifugal force acts on the support parts for opposite ends of the input shall to thus cause vibration; when the six transmission units are defined as unit #1, unit #2, unit #3, unit #4, unit #5, and unit #6 in order from one end side in the axial direction toward the other end side since the phase of unit #6 relative to the phase of unit the phase of unit #2 relative to the phase of unit #6, the phase of unit #4 relative to the phase of unit #2, the phase of unit #3 relative to the phase of unit #4, the phase of unit #5 relative to the phase of unit #3, and the phase of unit #1 relative to the phase of unit #5 are each displaced by 60° in the same direction, the loads generated by the transmission units cancel each other out, and it is thereby possible to minimize the load acting on the support parts for opposite ends of the input shaft and reduce the vibration.

Furthermore, in accordance with the second aspect of the present invention, since the transmission unit changes the speed of rotation of the input shaft and transmits it to the output shaft by changing the amount of eccentricity of the input side fulcrum from the axis of the input shaft, it is possible to vary the ratio of the vehicle power transmission device.

EXPLANATION OF REFERENCE NUMERALS AND SYMBOLS

Figure 1:
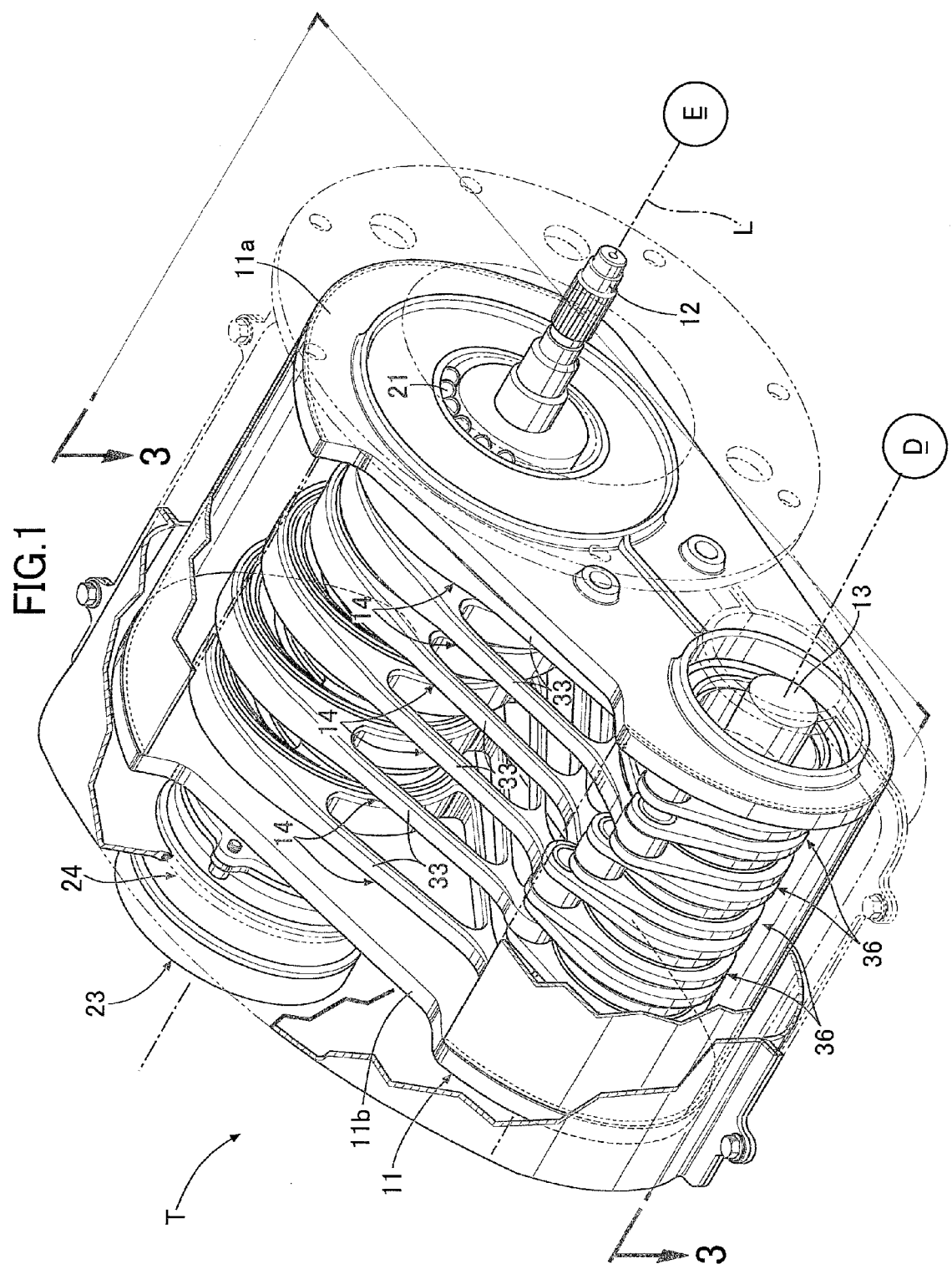
FIG. 1 is an overall perspective view of a continuously variable transmission. (first embodiment)
Figure 2:
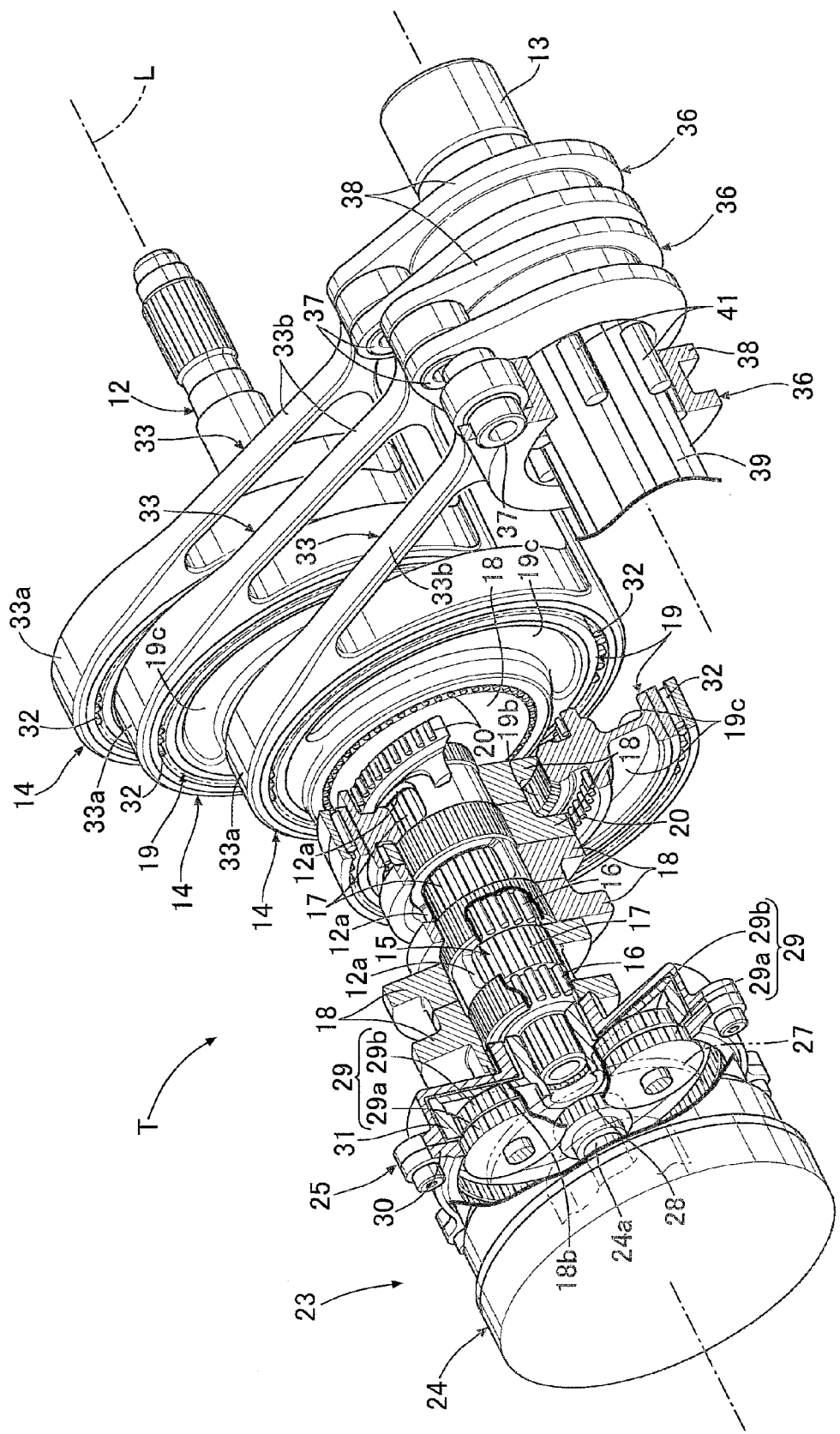
FIG. 2 is a partially cutaway perspective view of an essential part of the continuously variable transmission. (first embodiment)
Figure 3:
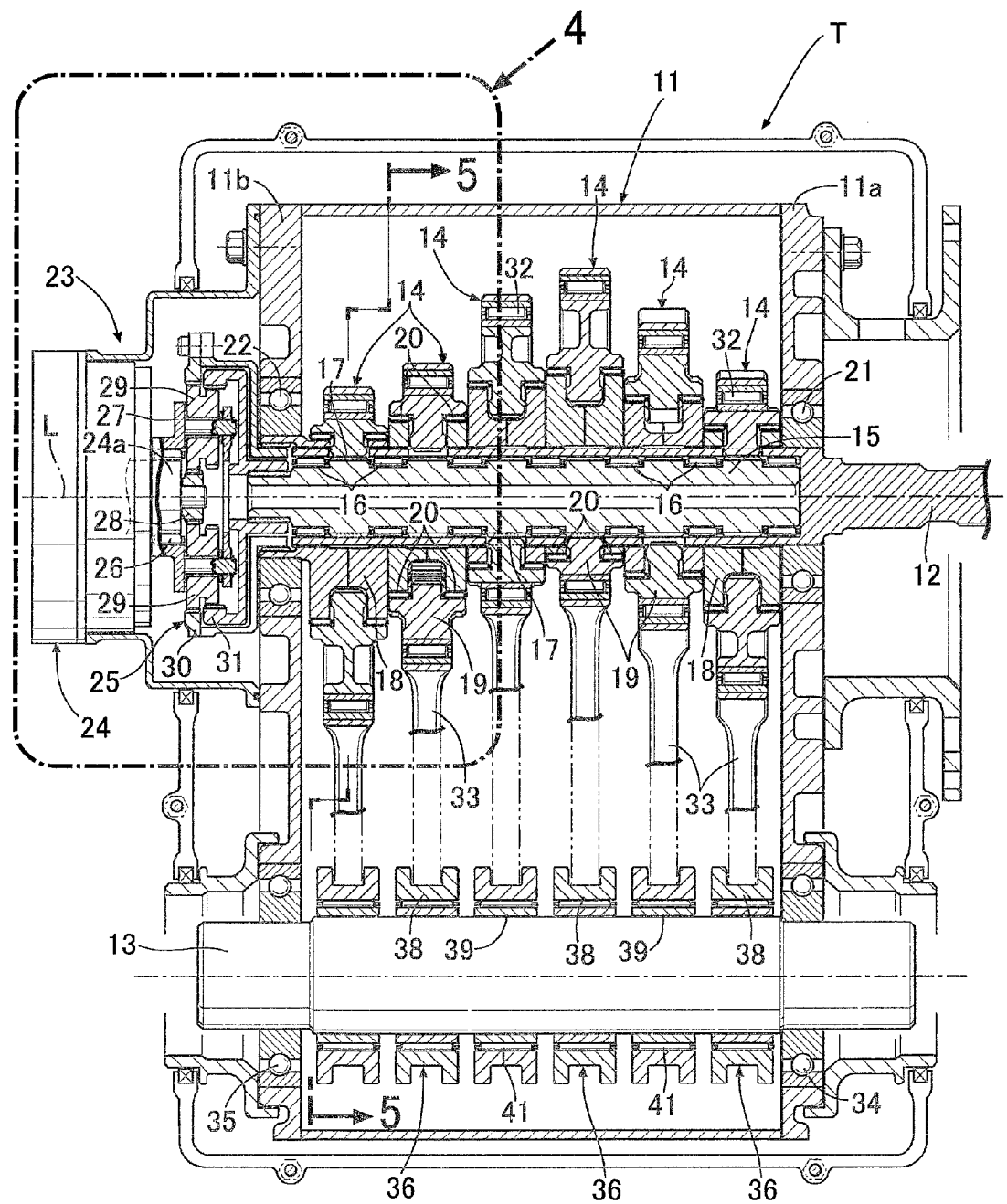
FIG. 3 is a sectional view along line 3-3 in FIG. 1. (first embodiment)
Figure 4:
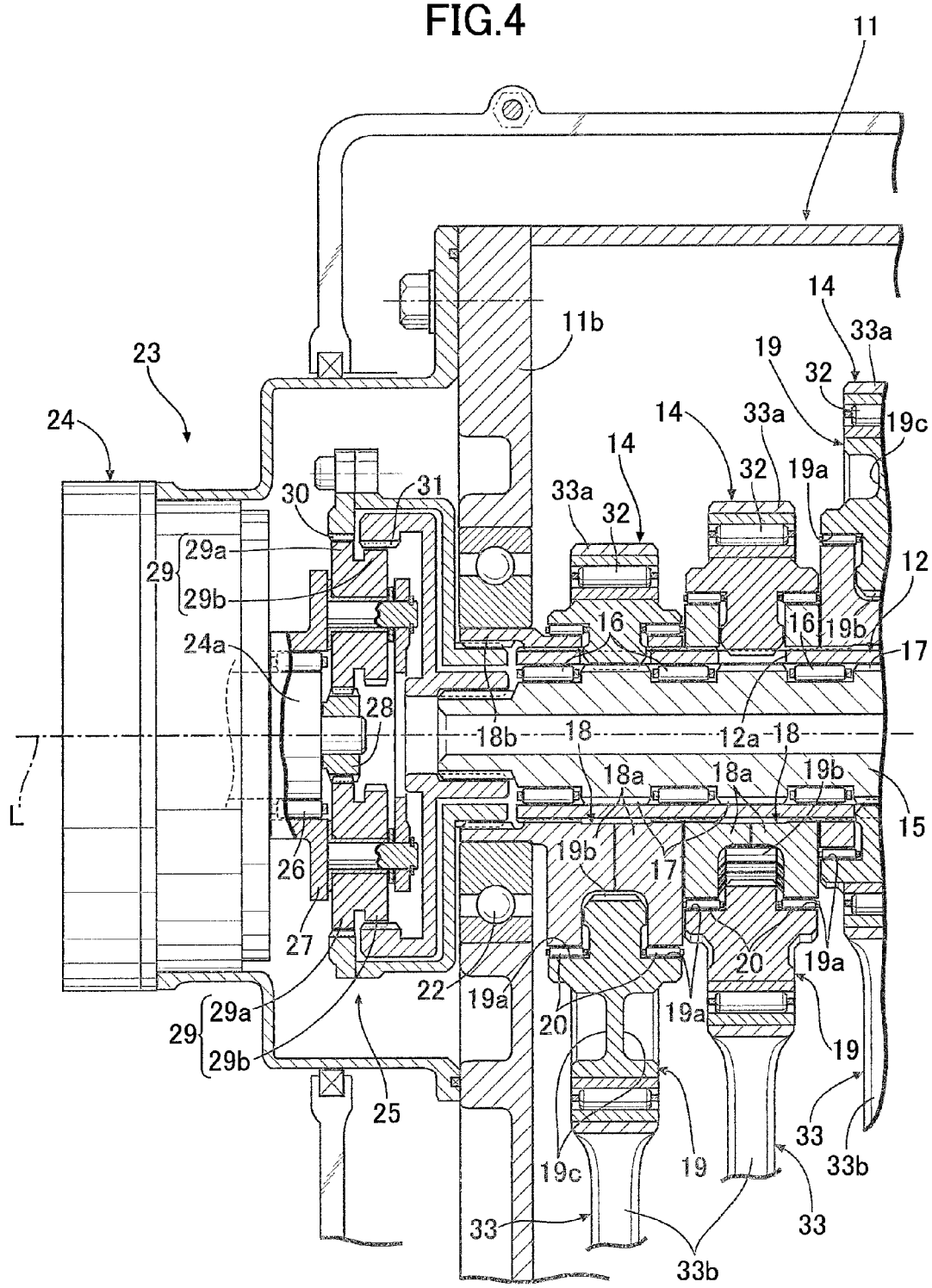
FIG. 4 is an enlarged view of part 4 in FIG. 3. (first embodiment)

12 Input shaft
13 Output shaft
14 Transmission unit
19 Eccentric disk (input side fulcrum)
33 Connecting rod
36 One-way clutch
37 Pin (output side fulcrum)
38 Outer member
E Engine (drive source)
L Axis of input shaft
ϵ Amount of eccentricity

MODE FOR CARRYING OUT THE INVENTION

A mode for carrying out the present invention is explained below by reference to FIG. 1 to FIG. 10.

First Embodiment

As shown in FIG. 1 to FIG. 5, an input shaft 12 and an output shaft 13 are supported on a pair of side walls 11a and 11b of a transmission case 11 of a continuously variable transmission T for an automobile so as to be parallel to each other, and rotation of the input shaft 12 connected to an engine E is transmitted to a driven wheel via six transmission units 14, the output shaft 13, and a differential gear D. A transmission shaft 15 having a common axis L with the input shaft 12 is relatively rotatably fitted into the interior of the input shaft 12, which is hollow, via seven needle bearings 16. Since the structures of the six transmission units 14 are substantially identical, the structure of one transmission unit 14 is explained below as being representative thereof.

The transmission unit 14 includes a pinion 17 provided on an outer peripheral face of the transmission shaft 15 and this pinion 17 is exposed through an opening 12a formed in the input shaft 12. A disk-shaped eccentric cam 18, which is split into two in the axis L direction, is spline-joined to the outer periphery of the input shaft 12 so as to sandwich the pinion 17 therebetween. A center O1 of the eccentric cam 18 is eccentric to the axis L of the input shaft 12 only by a distance d. The phases in the direction of eccentricity of the six eccentric cams 18 of the six transmission units 14 are each displaced from each other by 60°.

A pair of eccentric recess portions 19a and 19a formed in opposite end faces in the axis L direction of the disk-shaped eccentric disk 19 are rotatably supported on an outer peripheral face of the eccentric cam 18 via a pair of needle bearings 20 and 20. The center O1 of the eccentric recess portions 19a and 19a (that is, the center O1 of the eccentric cam 18) is displaced only by the distance d relative to a center O2 of the eccentric disk 19. That is, the distance d between the axis L of the input shaft 12 and the center O1 of the eccentric cam 18 is identical to the distance d between the center O1 of the eccentric cam 18 and the center O2 of the eccentric disk 19.

A pair of crescent-shaped guide portions 18a and 18a, which are coaxial with the center O1 of the eccentric cam 18, are provided on split faces of the eccentric cam 18, which is split into two in the axis L direction, and the extremities of teeth of a ring gear 19b formed so as to provide communication between bottom parts of the pair of eccentric recess portions 19a and 19a of the eccentric disk 19 abut slidably against outer peripheral faces of the guide portions 18a and 18a of the eccentric cam 18. The pinion 17 of the transmission shaft 15 meshes with the ring gear 19b of the eccentric disk 19 through the opening 12a of the input shaft 12.

The right end side of the input shaft 12 is directly supported on the right-hand side wall 11a of the transmission case 11 via a ball bearing 21. Furthermore, a tubular portion 18b provided integrally with one eccentric cam 18 positioned on the left end side of the input shaft 12 is supported on the left-hand side wall 11b of the transmission case 11 via a ball bearing 22, and the left end side of the input shaft 12 spline-joined to the inner periphery of the eccentric cam 18 is indirectly supported on the transmission case 11.

A transmission actuator 23 that varies the gear ratio of the continuously variable transmission T by rotating the transmission shaft 15 relative to the input shaft 12 includes an electric motor 24 supported on the transmission case 11 so that a motor shaft 24a is coaxial with the axis L, and a planetary gear mechanism 25 connected to the electric motor 24. The planetary gear mechanism 25 includes a carrier 27 rotatably supported on the electric motor 24 via a needle bearing 26, a sun gear 28 fixed to the motor shaft 24a, a plurality of double pinions 29 rotatably supported on the carrier 27, a first ring gear 30 spline-joined to the shaft end of the hollow input shaft 12 (strictly speaking, the tubular portion 18b of the one eccentric cam 18), and a second ring gear 31 spline-joined to the shaft end of the transmission shaft 15. Each double pinion 29 includes a large diameter first pinion 29a and a small diameter second pinion 29b, the first pinion 29a meshing with the sun gear 28 and the first ring gear 30, and the second pinion 29b meshing with the second ring gear 31.

An annular portion 33a on one end side of a connecting rod 33 is relatively rotatably supported on the outer periphery of the eccentric disk 19 via a roller bearing 32.

The output shaft 13 is supported on the pair of side walls 11a and 11b of the transmission case 11 by means of a pair of ball bearings 34 and 35, and a one-way clutch 36 is provided on the outer periphery of the output shaft 13. The one-way clutch 36 includes a ring-shaped outer member 38 pivotably supported at the extremity of a rod portion 33b of the connecting rod 33 via a pin 37, an inner member 39 disposed in the interior of the outer member 38 and fixed to the output shaft 13 and a plurality of rollers 41 disposed in a wedge-shaped space formed between an arc face on the inner periphery of the outer member 38 and a flat face on the outer periphery of the inner member 39 and urged by a plurality of springs 40.

Figure 6:
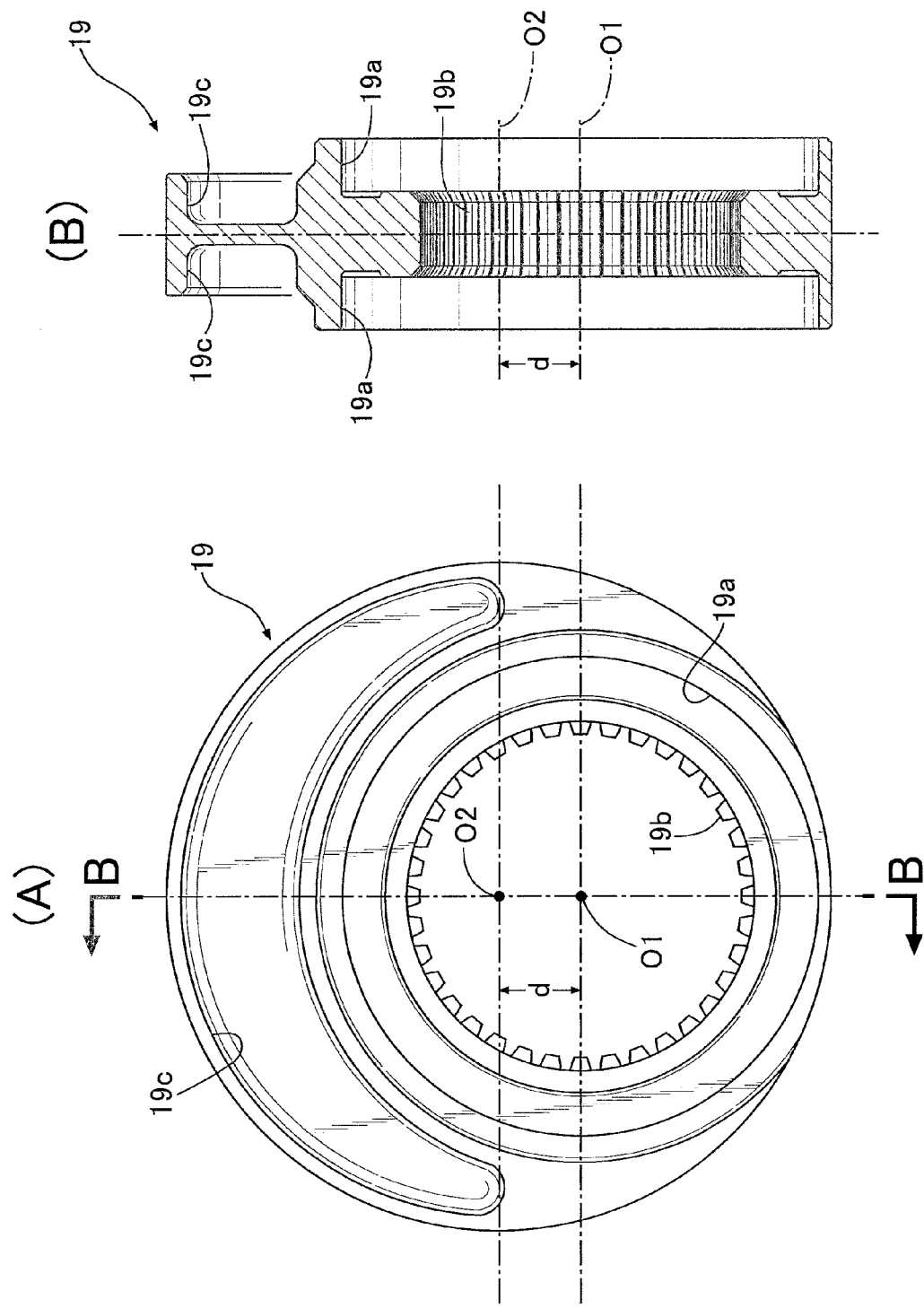
FIGS. 6 (A) and 6 (B) are diagrams showing the shape of an eccentric disk. (first embodiment)
Figure 8:
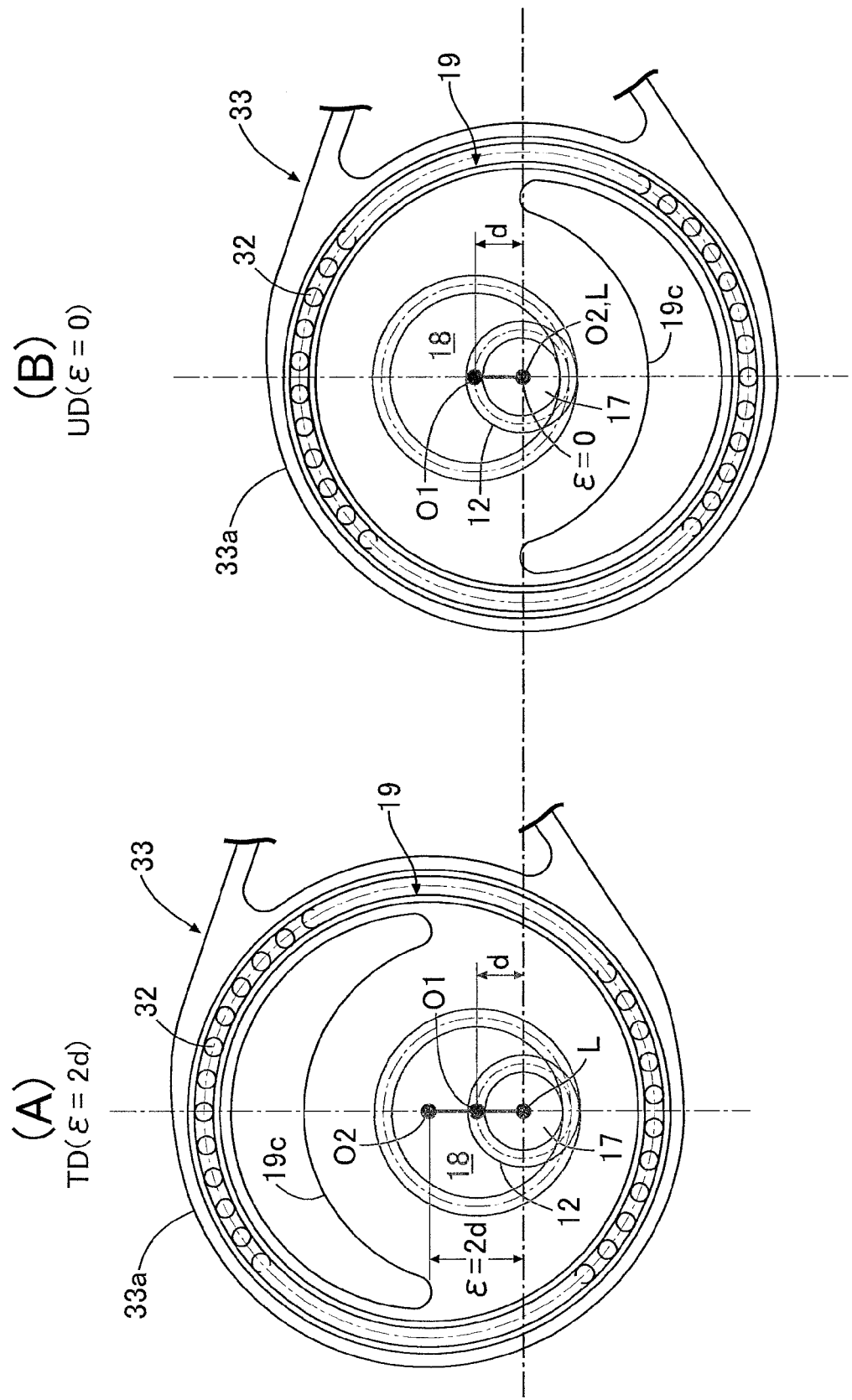
FIGS. 8 (A) and 8 (B) are diagrams showing the state of the eccentric disk in a TD gear ratio and a UD gear ratio. (first embodiment)

As shown in FIGS. 6 (A)-6 (B) and FIGS. 8 (A)-8 (B), the center O1 of the eccentric recess portions 19a and 19a (that is, the center O1 of the eccentric cam 18) is displaced by the distance d relative to the center O2 of the eccentric disk 19, the gap between the outer periphery of the eccentric disk 19 and the inner periphery of the eccentric recess portions 19a and 19a is non-uniform in the circumferential direction, and crescent-shaped cutout recess portions 19c and 19c are formed in a section where the gap is large.

Figure 9:
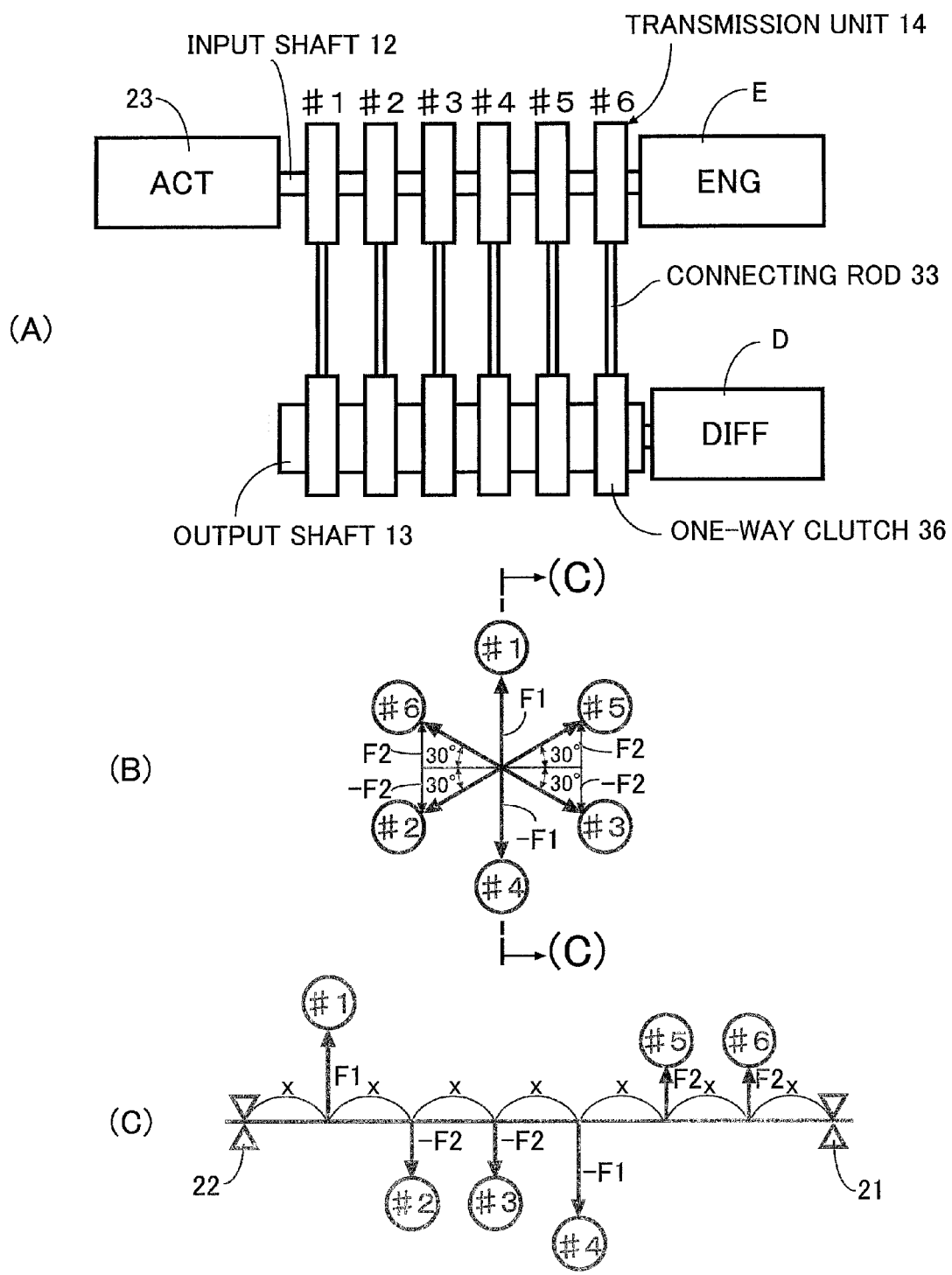
FIGS. 9 (A)-9 (C) are diagrams for explaining the load acting on a bearing supporting opposite end parts of an input shaft. (first embodiment)

As shown in FIG. 9 (A), the six transmission units 14 are called unit #1, unit #2, unit unit #3, unit #4, unit #5, and unit #6 from the left end side (the transmission actuator 23 side) to the right end side (the engine L and differential gear D side) of the input shaft 12 and the output shaft 13.

FIG. 9 (B) is a schematic diagram of the input shaft 12 when viewed in the axis L direction. The circled #1 to #6 denote the phase of each transmission unit 14 (the phase of the center O2 of the eccentric disk 19 relative to the axis L), and the phase of unit #6 relative to the phase of unit #1, the phase of unit #2 relative to the phase of unit #6, the phase of unit #4 relative to the phase of unit #2, the phase of unit #3 relative to the phase of unit #4, the phase of unit #5 relative to the phase of unit #3, and the phase of unit #1 relative to the phase of unit #5 are each displaced by 60° in the same direction.

FIG. 9 (C) is a cross section along the line C-C of FIG. 9 (B) and is a schematic diagram of the input shaft 12 when viewed from a direction perpendicular to the axis L. The transmission units 14 are arranged side by side at equal intervals x; the gap between unit #1 at the left end and the ball hearing 22 supporting the left end side of the input shaft 12 (see FIG. 3) is x, and the gap between unit #6 at the right end and the ball hearing 21 supporting the right end side of the input shaft 12 (see FIG. 3) is x.

The operation of one transmission unit 14 of the continuously variable transmission T is now explained.

Figure 5:
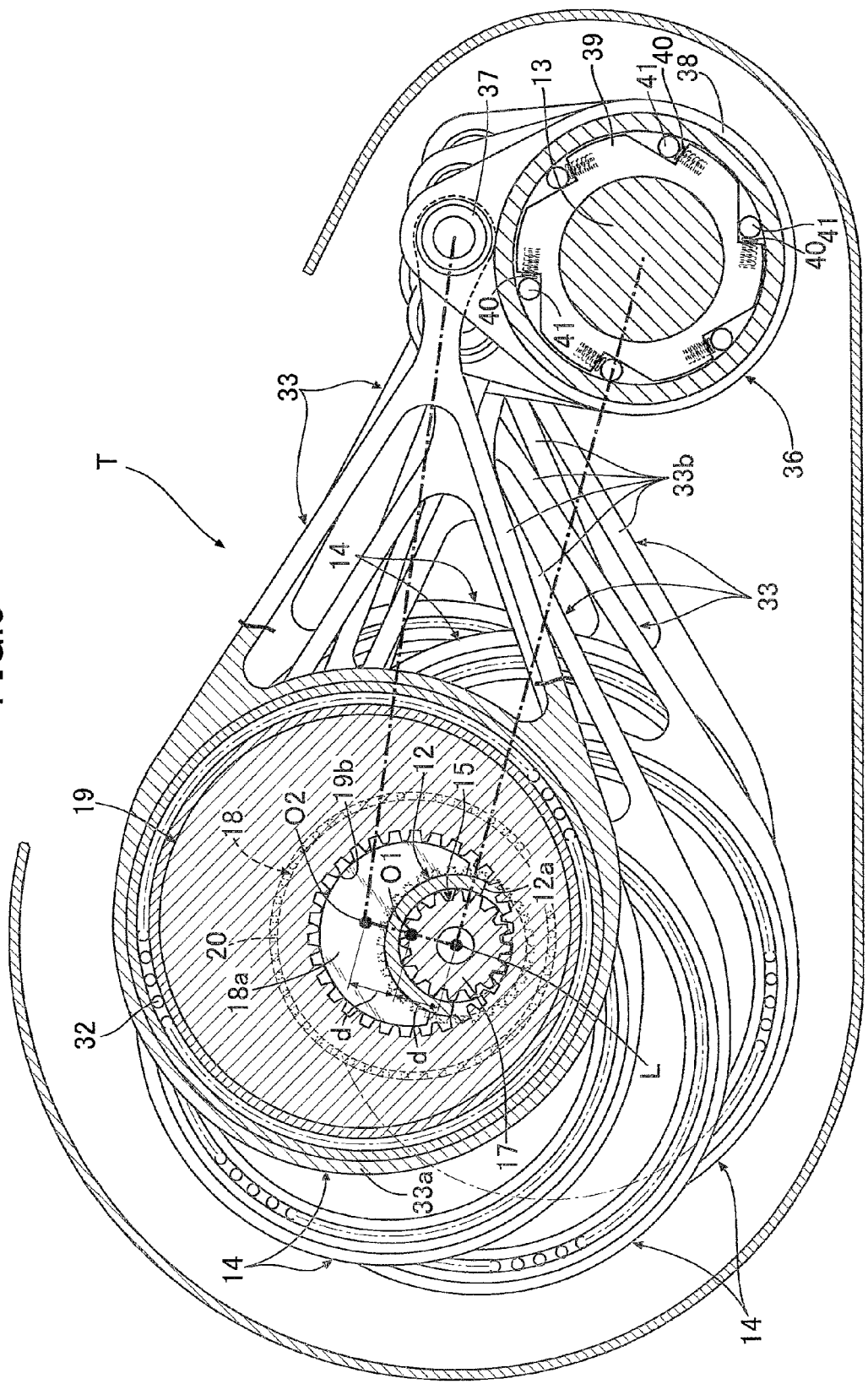
FIG. 5 is a sectional view along line 5-5 in FIG. 3. (first embodiment)
Figure 7:
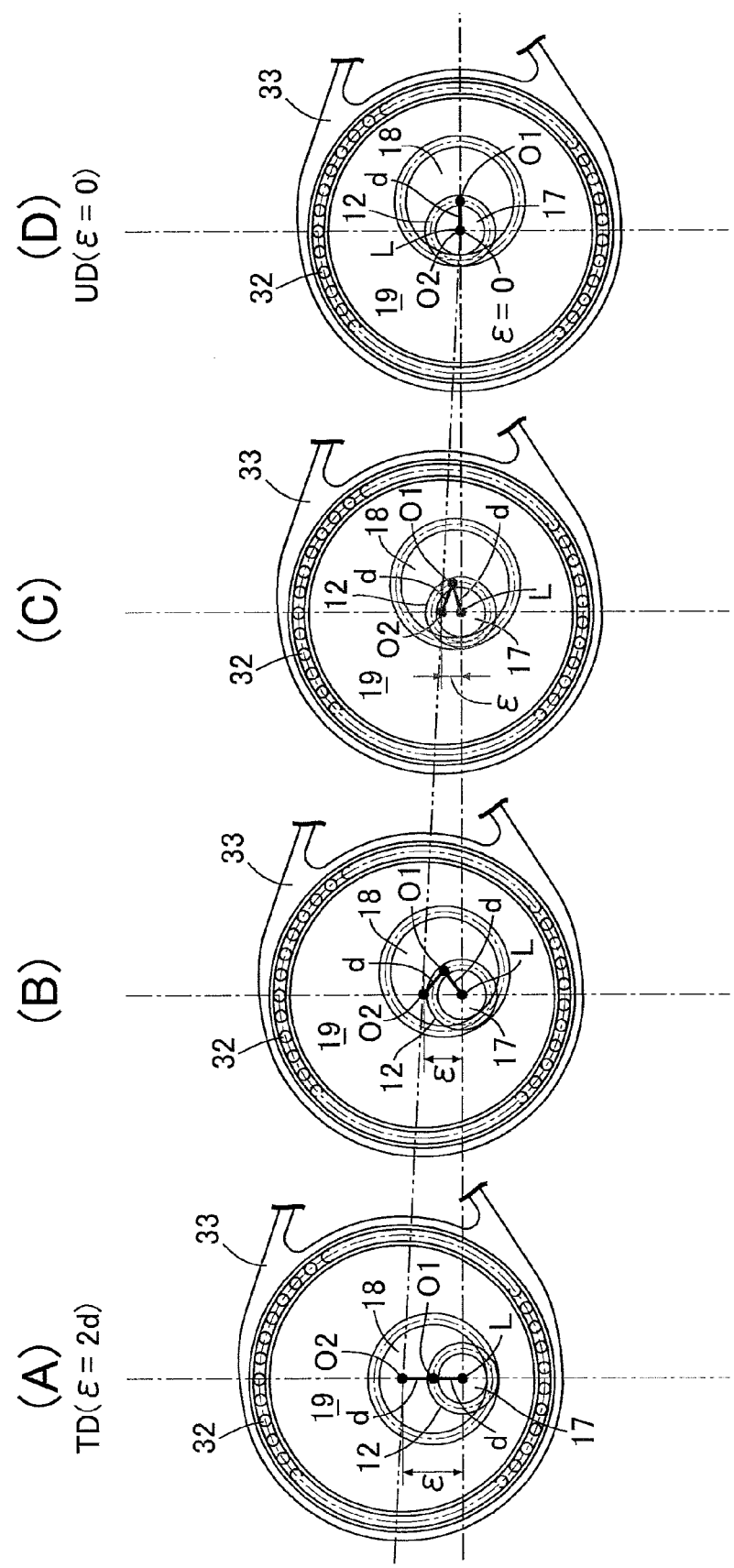
FIGS. 7 (A)-7 (D) are diagrams showing the relationship between the amount of eccentricity of the eccentric disk and gear ratio. (first embodiment)

As is clear from FIG. 5 and FIG. 7 (A) to FIG. 7 (D), when the center O2 of the eccentric disk 19 is eccentric with respect to the axis L of the input shaft 12 if the input shaft 12 is rotated by the engine E, the annular portion 33a of the connecting rod 33 rotates eccentrically around the axis L, and the rod portion 33b of the connecting rod 33 moves back and forth.

As a result, when the connecting rod 33 is pulled leftward in the figure in the process of moving back and forth, the rollers 41 urged by the springs 40 bite into the wedge-shaped spaces between the outer member 38 and the inner member 39; due to the outer member 38 and the inner member 39 being joined via the rollers 41, the one-way clutch 36 is engaged, and movement of the connecting rod 33 is transmitted to the output shaft 13. On the other hand, when the connecting rod 33 is pushed rightward in the figure during process of moving back and forth, the rollers 41 are pushed out from the wedge-shaped spaces between the outer member 38 and the inner member 39 while compressing the springs 40; due to the outer member 38 and the inner member 39 slipping relative to each other, engagement of the one-way clutch 36 is released, and movement of the connecting rod 33 is not transmitted to the output shaft 13.

In this way, since, while the input shaft 12 rotates once, rotation of the input shaft 12 is transmitted to the output shaft 13 only for a predetermined time, if the input shaft 12 rotates continuously, the output shaft 13 rotates intermittently. Since the phases in the direction of eccentricity of the eccentric disks 19 of the six transmission units 14 are each displaced from each other by 60°, the six transmission units 14 transmit rotation of the input shaft 12 to the output shaft 13 in turn, and the output shaft 13 rotates continuously.

In this process, the larger the amount of eccentricity $\epsilon$ of the eccentric disk 19, the larger the back-and-forth stroke of the connecting rod 33 becomes, the rotational angle of the output shaft 13 per cycle increases, and the gear ratio of the continuously variable transmission T becomes small. On the other hand, the smaller the amount of eccentricity $\epsilon$ of the eccentric disk 19, the smaller the back-and-forth stroke of the connecting rod 33 becomes, the rotational angle of the output shaft 13 per cycle decreases, and the gear ratio of the continuously variable transmission T becomes large. When the amount of eccentricity $\epsilon$ of the eccentric disk 19 becomes zero, even if the input shaft 12 rotates, since the connecting rod 33 stops moving, the output shaft 13 does not rotate, and the gear ratio of the continuously variable transmission T becomes a maximum (infinite).

When the transmission shaft 15 does not rotate relative to the input shaft 12, that is, when the input shaft 12 and the transmission shaft 15 rotate at the same speed, the gear ratio of the continuously variable transmission T is held constant. In order to rotate the input shaft 12 and the transmission shaft 15 at the same speed, the electric motor 24 may be rotated at the same speed as that of the input shaft 12. The reason therefor is because the first ring gear 30 of the planetary gear mechanism 25 is connected to input shaft 12 and rotates at the same speed as that of the input shaft 12, when the electric motor 24 is driven at the same speed as above, the sun gear 28 and the first ring gear 30 rotate at the same speed, the planetary gear mechanism 25 thereby attains a locked state, and the entirety rotates as a unit. As a result, the input shaft 12 and the transmission shaft 15 connected to the first ring gear 30 and the second ring gear 31, which rotate integrally, are integrated and rotate at the same speed without rotating relative to each other.

When the rotational speed of the electric motor 24 is increased or decreased relative to the rotational speed of the input shaft 12, since the first ring gear 30 joined to the input shaft 12 and the sun gear 28 connected to the electric motor 24 rotate relative to each other, the carrier 27 rotates relative to the first ring gear 30. In this process, since the gear ratio of the first ring gear 30 and the first pinion 29a, which mesh with each other, is slightly different from the gear ratio of the second ring gear 31 and the second pinion 29b, which mesh with each other, the input shaft 12 connected to the first ring gear 30 rotates relative to the transmission shaft 15 connected to the second ring gear 31.

In this way, when the transmission shaft 15 rotates relative to the input shaft 12, the eccentric recess portions 19a and 19a of the eccentric disk 19 having the ring gear 19b meshing with the pinion 17 of each transmission unit 14 are guided by the guide portions 18a and 18a of the eccentric cam 18, which is integral with the input shaft 12, and rotate, and the amount of eccentricity $\epsilon$ of the center O2 of the eccentric disk 19 relative to the axis L of the input shaft 12 changes.

FIG. 7 (A) shows a state in which the gear ratio is a minimum (gear ratio:TD); in this process the amount of eccentricity $\epsilon$ of the center O2 of the eccentric disk 19 relative to the axis L of the input shaft 12 becomes a maximum value of 2d, which is equal to the sum of the distance d from the axis L of the input shaft 12 to the center O1 of the eccentric cam 18 and the distance d from the center O1 of the eccentric cam 18 to the center O2 of the eccentric disk 19. When the transmission shaft 15 rotates relative to the input shad 12, the eccentric disk 19 rotates relative to the eccentric cam 18 integral with the input shaft 12, as shown in FIG. 7 (B) and FIG. 7 (C) the amount of eccentricity $\epsilon$ of the center O2 of the eccentric disk 19 relative to the axis L of the input shaft 12 gradually decreases from a maximum value of 2d, and the gear ratio increases. When the transmission shaft 15 rotates further relative to the input shaft 12, the eccentric disk 19 rotates anther relative to the eccentric cam 18 integral with the input shaft 12, as shown in FIG. 7 (D) the center O2 of the eccentric disk 19 finally overlaps the axis L of the input shaft 12, the amount of eccentricity $\epsilon$ becomes zero, the gear ratio becomes a maximum (infinite) state (gear ratio:UD), and power transmission to the output shad 13 is cut off.

The load due to the centrifugal force generated accompanying rotation of the input shaft 12 is now discussed.

In FIG. 9 (B) and FIG. 9 (C), when the input shaft 12 rotates, a load F1 due to centrifugal force directed toward the radially outer side acts on the eccentric disk 19 of each transmission unit 14. When an upward load is defined as being positive and a downward load is defined as being negative, the load generated by unit #1 is F1 (upward) and the load generated by unit #4 is −F1 (downward). Since the phases of unit #2 and unit #3 are inclined downward by 30° relative to the horizontal direction, the vertical component of the load −F2=−F1×sin 30°=−F1/2 (downward). Since the phases of unit #5 and unit #6 are inclined upward by 30° relative to the horizontal direction, the vertical component of the load F2=F1×sin 30°=F1/2 (upward).

Since the distance between unit #1 and the left ball bearing 22 is x and the distance between unit #1 and the right ball bearing 21 is 6x, the upward load F1 of unit #1 is distributed to the left ball bearing 22 at a ratio of 6/7 and to the right ball bearing 21 at a ratio of 1/7, consequently a load of 6/7×F1 acts on the left ball bearing 22, and a load of 1/7×F1 acts on the right ball bearing 22.

Since the distance between unit #2 and the left ball bearing 22 is 2x and the distance between unit #2 and the right ball bearing 21 is 5x, the downward load −F2 of unit #2 is distributed to the left ball bearing 22 at a ratio of 5/7 and to the right ball bearing 21 at a ratio of 2/7, consequently a load of −5/7×F2 acts on the left ball bearing 22, and a load of −2/7×F2 acts on the right ball bearing 21.

In this way, the load acting on the Left ball bearing 22 from units #1 to #6 is calculated as follows.
unit #1: 6/7×F1
unit #2: −5/7×F2
unit #3: −4/7×F2
unit #4: −3/7×F1
unit #5: 2/7×F2
unit #6: 1/7×F2
Adding these six loads gives 3/7×F1−6/7×F2; since F2=F1/2 the total value of the six loads is zero, and it can thus be understood that the loads acting on the left ball bearing 22 due to units #1 to #6 cancel each other out.

In the same manner the load acting on the right bait bearing 21 from units #1 to #6 is calculated as follows.
unit #1: 1/7×F1
unit #2: −2/7×F2
unit #3: −3/7×F2
unit #4: −4/7×F1
unit #5: 5/7×F2
unit #6: 6/7×F2
Adding these six loads gives −3/7×F1+6/7×F2; since F2=F1/2 the total value of the six loads is zero, and it can thus be understood that the loads acting on the right ball bearing 21 due to units #1 to #6 cancel each other out.

As hereinbefore described, in accordance with the present embodiment, it is possible, merely by setting the direction of eccentricity of the eccentric disks 19 of the six transmission units 14 in predetermined directions, to minimize the total load inputted, by means of the centrifugal force acting on the eccentric disks 19, to the ball bearings 21 and 22 supporting opposite end sides of the input shaft 12, thus reducing the occurrence of vibration in the input shaft 12.

Figure 10:
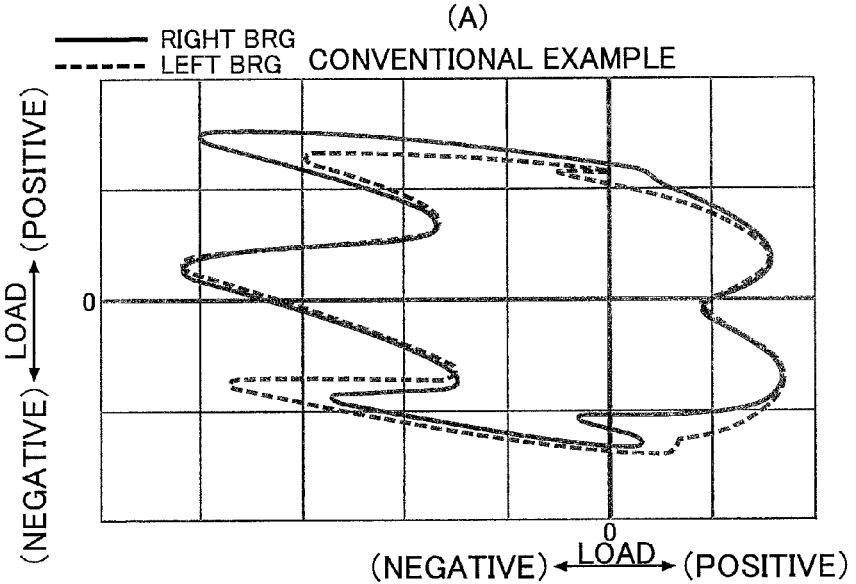
FIGS. 10 (A)-10 (C) are graphs for explaining the operational effect of the present invention. (first embodiment)
Figure 10:
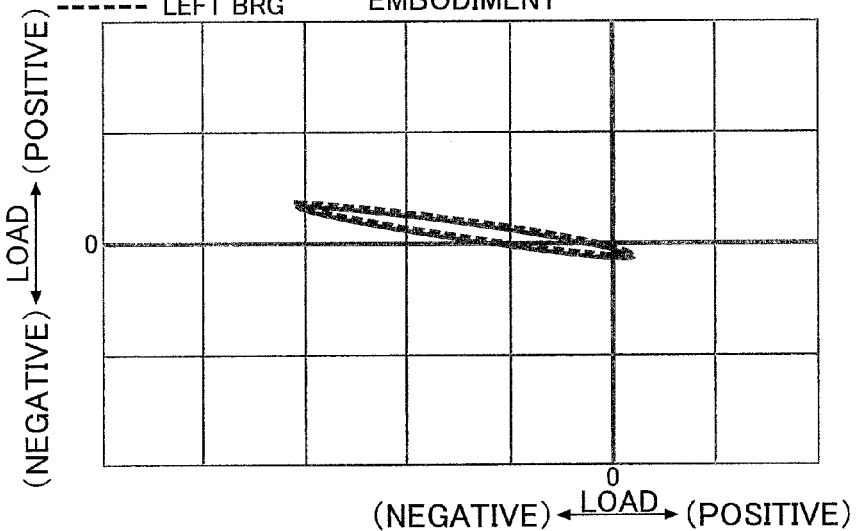
Figure 10:
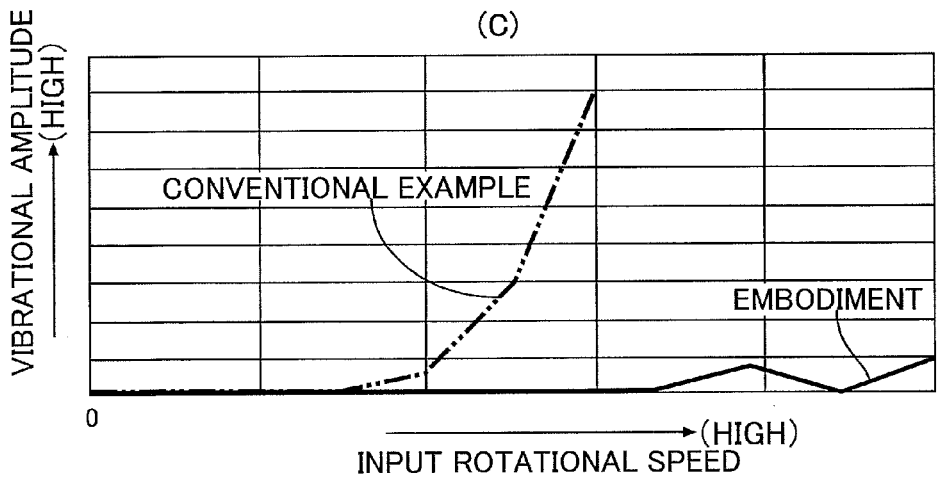

The graph in FIG. 10 (A) shows vertical and lateral loads acting on a right ball bearing 21 and a left ball bearing 22 of a continuously variable transmission T of a conventional example in which the phases of units #1 to #6 are each displaced sequentially by 60°, and the graph in FIG. 10 (B) shows the present embodiment corresponding thereto. In the conventional example of FIG. 10 (A), both the vertical load and the lateral load are large, but in the embodiment of FIG. 10 (B) the vertical load is substantially zero for the reasons given above, and the horizontal load is also greatly decreased although some degree of load generated by the inertia of the outer members 38 of the one-way clutches 36 remains.

The graph of FIG. 10 (C) shows the change in amplitude of vibration with respect to the rotational speed input into the input shaft 12, and in the conventional example the amplitude increases rapidly when the input rotational speed exceeds 2000 rpm, whereas in the present embodiment the amplitude can be suppressed to a very low level throughout the input rotational speed region.

An embodiment of the present invention is explained above, but the present invention may be modified in a variety of ways as long as the modifications do not depart from the spirit and scope thereof.

For example, the drive source of the present invention is not limited to the engine E of the embodiment, and another drive source such as an electric motor may be used.

Furthermore, the transmission unit 14 of the present invention does not necessarily have a function of changing speed and may be any as long as it has a function of transmitting a driving force.

Moreover, in the embodiment, the gap x between unit #1 at the left end and the ball bearing 22 supporting the left end of the input shaft 12 and the gap x between unit #6 at the right end and the ball bearing 21 supporting the right end of the input shaft 12 coincides with the gap x between the transmission units 14 (see FIG. 9 (C)), but they do not need to strictly coincide with each other, and a sufficient vibration reducing effect can be obtained even if they do not coincide with each other.

Furthermore, in the embodiment opposite ends of the input shaft 12 are supported by the ball bearings 21 and 22, but an bearing other than the ball hearings 21 and 22 may be used.

The invention claimed is:

1. A vehicle power transmission device comprising
six transmission units for transmitting rotation of an input shaft connected to a drive source to an output shaft, the transmission units being arranged side by side in an axial direction between the input shaft and the output shaft,
the transmission units each comprising
an input side fulcrum that rotates eccentrically together with the input shaft,
a one-way clutch that is connected to the output shaft,
an output side fulcrum that is provided on an outer member of the one-way clutch, and
a connecting rod that has opposite ends connected to the input side fulcrum and the output side fulcrum and moves back and forth,
wherein when the six transmission units are defined as unit #1, unit #2, unit #3, unit #4, unit #5 and unit #6 in order from one end side in the axial direction toward the other end side, the phase of unit #6 relative to the phase of unit #1, the phase of unit #2 relative to the phase of unit #6, the phase of unit #4 relative to the phase of unit #2, the phase of unit #3 relative to the phase of unit #4, the phase of unit #5 relative to the phase of unit #3, and the phase of unit #1 relative to the phase of unit #5 are each displaced by 60° in the same direction.

2. The vehicle power transmission device according to claim 1, wherein the transmission unit changes the speed of rotation of the input shaft and transmits the rotation to the output shaft by changing an amount of eccentricity (ε) of the input side fulcrum from the axis of the input shaft.

* * * * *